(12) United States Patent
Vogel et al.

(10) Patent No.: US 10,987,751 B2
(45) Date of Patent: Apr. 27, 2021

(54) FORCE SENSING CONTROL APPARATUS FOR WELDING MACHINES

(71) Applicants: David Vogel, Thornton, CO (US); Gary F. Skinner, Broomfield, CO (US)

(72) Inventors: David Vogel, Thornton, CO (US); Gary F. Skinner, Broomfield, CO (US)

( * ) Notice: Subject to any disclaimer, the term of this patent is extended or adjusted under 35 U.S.C. 154(b) by 305 days.

(21) Appl. No.: 14/591,832

(22) Filed: Jan. 7, 2015

(65) Prior Publication Data
US 2016/0193682 A1 Jul. 7, 2016

(51) Int. Cl.
| | |
|---|---|
| *B23K 9/10* | (2006.01) |
| *B23K 9/167* | (2006.01) |
| *B23K 9/29* | (2006.01) |
| *B23K 9/32* | (2006.01) |

(52) U.S. Cl.
CPC ............ *B23K 9/1087* (2013.01); *B23K 9/167* (2013.01); *B23K 9/296* (2013.01); *B23K 9/32* (2013.01)

(58) Field of Classification Search
CPC ... B23K 9/12; B23K 9/10; B23K 9/28; B23K 9/32
USPC ................. 219/75, 132, 136, 137.31–137.63
See application file for complete search history.

(56) References Cited

U.S. PATENT DOCUMENTS

| | | | |
|---|---|---|---|
| 2,658,132 A | 11/1950 | Welch | |
| 2,986,953 A | 6/1961 | De Armand et al. | |
| 3,272,949 A * | 9/1966 | Lawrence | H01H 1/2025 200/243 |
| 3,968,341 A | 7/1976 | Manning | |
| 4,051,344 A | 9/1977 | Robbins | |
| 4,216,367 A | 8/1980 | Risberg | |
| 4,227,066 A | 10/1980 | Bulwidas | |
| 4,410,789 A | 10/1983 | Story | |
| 4,510,373 A | 4/1985 | Cox et al. | |
| 4,608,482 A | 8/1986 | Cox et al. | |
| 4,641,292 A | 2/1987 | Tunnell et al. | |
| 4,948,942 A | 8/1990 | Hiibel | |
| 6,051,808 A | 4/2000 | Kleppen | |
| 6,285,003 B1 | 9/2001 | Kleppen et al. | |

(Continued)

OTHER PUBLICATIONS

Force Sensing Resistor Integration Guide and Evaluation Parts Catalog, Interlink Electronics, 2009.*
http://www.ni.com/white-paper/2774/en/.*

*Primary Examiner* — Robert J Utama
*Assistant Examiner* — Joe E Mills, Jr.
(74) *Attorney, Agent, or Firm* — Macheledt Bales LLP; Jennifer L. Bales

(57) ABSTRACT

Apparatus for allowing a welder to control the output power of a welding machine, and thus its arc power by applying force to a surface of a force sensing transducer assembly. The force sensing transducer assembly generates a force signal based upon the force applied, for example by reducing the resistance within the force sensing transducer assembly. A control interface module then receives the force signal and controls the welding machine power output based upon the force signal. The welder may set the range of force to change the arc power by setting a minimum amount of force to actuate the welding machine and a maximum force that increases the output power of the welding machine (force below the minimum does not actuate the welding machine and force above the maximum does not increase the welding machine power above a certain level).

20 Claims, 13 Drawing Sheets

(56) References Cited

U.S. PATENT DOCUMENTS

| | | | |
|---|---|---|---|
| 6,386,023 B1* | 5/2002 | Sajna | H01H 13/18 |
| | | | 73/146 |
| 6,420,680 B1 | 7/2002 | Samodell | |
| 6,531,673 B2 | 3/2003 | Fedorcak | |
| 6,956,184 B2 | 10/2005 | Blide | |
| 7,244,908 B2 | 7/2007 | Ward | |
| 8,653,414 B2 | 2/2014 | Long et al. | |
| 8,785,817 B2 | 6/2014 | Luck et al. | |
| 2004/0194550 A1* | 10/2004 | Wakasugi | G01L 23/24 |
| | | | 73/754 |
| 2009/0200283 A1* | 8/2009 | Bland | G08C 17/02 |
| | | | 219/132 |
| 2009/0272221 A1 | 11/2009 | Long et al. | |
| 2011/0248008 A1 | 10/2011 | Long et al. | |
| 2011/0248009 A1* | 10/2011 | Long | G05G 1/305 |
| | | | 219/132 |
| 2012/0012561 A1 | 1/2012 | Wiryadinata | |
| 2012/0065972 A1* | 3/2012 | Strifler | G10L 15/26 |
| | | | 704/246 |
| 2014/0144898 A1* | 5/2014 | Upton | B23K 9/1043 |
| | | | 219/132 |
| 2015/0305671 A1* | 10/2015 | Yoon | A61B 5/01 |
| | | | 600/301 |

* cited by examiner

FORCE SENSING CONTROL APPARATUS FOR WELDING MACHINES

BACKGROUND OF THE INVENTION

Field of the Invention

The present invention relates to control devices for allowing a welder to control a welding machine. In particular, the present invention relates to force sensing control units for electric arc welding machines.

Discussion of Related Art

Electric arc welding has been in use for more than 120 years for the purpose of joining or fusing metals by means localized heating of those metals using an electric arc. The term "welding machine" is used herein to designate an electric arc welding machine used for such joining or fusing of metals.

This electric arc is provided by means of a welding machine operated off of AC line power, battery, generator, alternator, etc. which provides electric current via flexible insulated cables to one or more electrodes and/or to the metals to be welded. From invention of arc welding, there has been a need by the person performing the welding process, referred to herein as "the welder", to be able to easily control the amount of power produced by the welding machine and thence the heat of the arc to control the amount of melting of the metals being welded. In the earliest processes of arc welding, some still widely in use today, the welding voltage or current is set at the welding machine and the welder must go to the location of the welding machine to make any desired change in power output settings. This generally means temporarily stopping the process of welding to implement such changes.

With certain types of welding processes it is advantageous for the welder to be able to effect these changes in welding machine power output in real time while actually performing the welding operation. For the welder, this means not having to travel to the welding machine; rather being able to control the welding machine power output remotely from the point where the welding is being done, in real time, without having to discontinue the welding operation to do so.

In one type of welding process, correctly known as GTAW (Gas Tungsten Arc Welding) and more commonly known as TIG (Tungsten Inert Gas) welding, a foot pedal assembly is used to remotely control the welding arc current in real time by the welder. FIG. 1 (Prior Art) shows an example of such a pedal assembly 40. This foot pedal assembly is comprised of a base to which is attached a pivoting, mounted foot pedal. This foot pedal is physically coupled to a rheostat or potentiometer. As the foot pedal is moved through a predetermined range of motion by the welder's foot, a variable electrical signal is transmitted to the welding machine by way of an electrical connecting cable. The electrical signal produced by the foot pedal is proportional to the position of the foot pedal. This transmitted signal then effects electrical or mechanical changes within the welding machine power supply which produce the desired variation in the welding machine output current.

In performing the welding operation, the welder employs a TIG welding torch which contains a tungsten metal electrode and inert gas supply nozzle. This torch is electrically connected to a welding machine by means of an electrical cable which transmits electrical current from the welding machine to the TIG welding torch. A welder generally holds a TIG welding torch in one hand and a piece of metal filler rod in the other hand. With both hands in use holding a TIG welding torch and filler rod, a welder will generally employ one of his feet to remotely control the welding current in real time by means of the foot pedal as they weld.

A foot pedal for welding machine output control is traditionally the standard type of control for GTAW arc welding. While widely used to control a GTAW welding machine, in many situations a foot pedal control is impractical. Even in an environment where the foot pedal works well, the cable which connects the foot pedal to the welding machine may be a hindrance, frequently becoming entangled with other various cords and items which share the same area. Moving the foot pedal from one location to another in the work area, as is often necessary, requires having to route the connecting cord around welding table legs, power tool cords, work pieces and various other objects in the immediate vicinity. A mechanical foot control pedal is also somewhat large and cumbersome, as it requires space for a robust mechanical operating mechanism and enough physical size to support the entire foot as it is operated by the welder.

In recent times, a wireless remotely operated foot pedal has been available. This addresses some of the noted problems with the foot pedal, however, other difficulties remain with a moving foot pedal for remote control of a welding machine. The foot pedal also requires substantial movement of components and the need to position the foot in one particular orientation. Further, foot pedals allow for the possibility of foreign objects becoming stuck between the moving control surfaces.

In many environments where TIG welding is performed, frequently conditions are encountered which make use of a foot pedal for remote control of a welding machine impractical. Welding operations may put the welder into awkward positions which require that both feet of the welder be used for proper balance or securing a safe stance. Attempting to operate a foot pedal in such situations can be difficult or dangerous. It is possible to perform a TIG welding operation with no active current control, but weld quality is often adversely affected.

As an alternative to foot pedal control, a hand operated welding machine remote control was devised. This control normally employs a sliding or rotating potentiometer which is attached to the TIG welding torch itself, and is actuated by finger or thumb movement by either a sliding or twisting motion of the welder. FIG. 2 (Prior Art) shows a TIG torch 32 employing a sliding control element 41 for moving a potentiometer. In instances where foot pedal control is difficult or impossible to use, this hand control can be advantageous, but there is still need for improvement. Effective utilization of such a control requires the accurate positioning of a control input member, such as a rotary knob, slider button or finger pedal, which can be difficult.

As a specific, controlled movement of the remote control input device is needed, a digit must be dedicated to that specific operation, with the consequence of making that digit unavailable for use in holding the welding torch. The result is that this detracts from accurate control of a TIG welding torch. It also requires simultaneous motor skill input from the brain of the welder. This requirement to split the tasks of one hand between holding the welding torch and concurrently operating a control is awkward for the welder.

Currently available hand operated controls provide some improvement over foot pedal control at times, however improvement is still needed. Due to the nature of TIG welding, it is desirable to keep the welding torch as small and compact as possible while fulfilling the required functions. Traditional hand operated controls are somewhat bulky when fitted to the torch body. Using a potentiometer of either the linear slide actuated or rotary dial actuated type requires a moderate amount of space on the torch body. In addition to being somewhat bulky and unwieldy, the hand control is usually fixed into one location on the welding torch. In the process of welding however, it is often useful to be able to grip the torch in a wide variety of ways and having the control actuator fixed in one particular location on the torch body can make operation of that control difficult. Additionally, having to dedicate a finger or thumb to being in the correct position to slide back and forth to operate a linear slide control or moving side to side to rotate a control knob or wheel, all while trying to hold the torch steady with the same hand, can adversely affect the ability of the welder to control movement of the torch.

Remote welding machine controls are used in a generally hostile environment. Such controls are likely to be subjected to water, dirt and various possible corrosive or damaging chemicals. The moving parts which are found in previous control systems are difficult to seal and protect against damage from these environmental hazards. With existing prior art control mechanisms which require movement of a control surface, it can be a challenge to provide effective sealing to prevent contamination by dirt or moisture and resulting damage to the controls.

A need remains in the art for improved apparatus and methods for allowing a welder to control a welding machine.

SUMMARY OF THE INVENTION

It is an object of the present invention to provide improved apparatus and methods for allowing a welder to control a welding machine.

Embodiments of the present invention eliminate the requirement to move a control element to a particular position to obtain the desired result. No substantial movement of a control element beyond compression or deformation is needed, but rather the application of force/pressure to a generally static surface is detected. This greatly simplifies control operation. In other words, the surface is substantially fixed in position with respect to the force sensing transducer. Since virtually no movement of any parts is required for use, substantially less thought and digital coordination is required from the welder to modulate control variables while simultaneously positioning the TIG torch. In addition, environmental sealing is greatly simplified. Cost of construction and reduction of needed service is noted as a positive result.

In accordance with embodiments of the present invention, there is provided a force sensing transducer based control element, which detects a variable mechanical force applied to the sensor by a welder, and converts that applied force into a corresponding electrical force signal and thence by application of optional electronic processes within a control interface module produces a variable electrical output control signal for controlling predetermined operation parameters of an electric arc welding machine. In some embodiments, this force signal is provided to the control interface module wirelessly, by a remote control element. The control interface module may be integrated within the welding machine housing, or may be a separate unit.

Embodiments of the present invention comprise a force sensing transducer to produce a control signal; a way to convey the control signal by means of electrical cable, wireless RF or optical transmission; and optionally, a mounting or holding system for the force sensing transducer; a control interface module to receive an input signal from the force sensing transducer and convert that into an output control signal; and a power supply source.

In some embodiments, the force sensing transducer is fastened to a GTAW TIG welding torch and positioned to detect mechanical force input signals from a selected digit of the welder's hand (or other part of the welder's hand). In other embodiments, the force or pressure sensing transducer may be designed to receive force input from human bite, thus being held between the teeth. In other embodiments, the force or pressure sensing transducer is contained in a multipurpose sensor module (generally called a "puck" herein) which allows force to be input to the sensor module from compression between a substantially solid surface and any convenient part or parts of a welder's body, such as foot, knee, elbow, palm, etc.

The power source may be any suitable power source, generally of low voltage, including separate wall AC adapter, DC adapter, batteries, rechargeable or not, or power take off directly from the welding machine power supply lines by means of direct connection or non-contact, inductive pick up. The power supply may also be part of the welding machine itself, for example if the control interface module is integrated within the welding machine.

In one embodiment, a force sensing transducer comprises a backing rigid circuit board substrate supporting a pattern of interlaced metallic conductive traces around which is placed a spacer ring or some arc portion thereof, which has been coated on both sides with an adhesive compound.

In another embodiment, the force sensitive transducer assembly is affixed to a formed metallic, plastic, or composite spring tensioned clip designed to fit co-axially and in close proximity to the commonly cylindrical form handle portion of a TIG welding torch, thus providing a secure, but easily positioned and relocated means of attaching the force sensitive transducer to said welding torch. In this preferred embodiment, the force sensitive portion of the transducer would generally be affixed to the body of the TIG welding torch by means of previously mentioned spring clip, in a location which facilitates simple application of the welder's finger or thumb pressure to the transducer in a comfortable way.

In another embodiment, a force sensing transducer unitized module has a module housing having, for example, a cylindrical form, a generally planar solid surface forming one end, and a central, open cylindrical enclosure space extending axially from that end through the opposing end. A circular design sensor board comprising a base substrate and having thereupon several conductive sensor trace patterns arrayed in a radial pattern, evenly spaced and equidistant from the central axis point of the base substrate is positioned concentrically upon the planar housing end in such a manner that the force sensing areas are facing away from the module housing.

Note that pressure transducer and force transducer are used interchangeably herein. Since pressure is force over area, a control signal related to force will also be related to pressure.

Force sensing control apparatus for welding machines comprises a force sensing transducer assembly for sensing force applied by a welder and for generating a force signal, a control interface module for generating a welding machine control signal based upon the force signal, the welding machine control signal configured to control an operation parameter of a welding machine, and a transmission medium for transmitting the force signal to the control interface module. A user interface allows the welder to set an effective range of the force signal to control the operation parameter, e.g. the force range that causes the welding machine output power to vary. For example, a user interface could include an actuation point sensitivity control for determining the minimum amount of force to configure the welding machine control signal to actuate the welding machine and a maximum force level control for determining the maximum amount of force that will configure the welding machine control signal to increase the output power of the welding machine, so that the actuation point sensitivity control and the maximum force level control are adjustable by a welder. The user interface might include an indicator of the welding machine control signal.

The force sensing transducer assembly comprises a force transducer for converting force into a force signal and a surface configured for pressing by the welder in order to provide force to the force sensing transducer, the surface substantially fixed in place with respect to the force sensing transducer. In some embodiments, the force sensing transducer reduces resistance within the force sensing transducer assembly based upon the force, so that the force signal is based upon the reduced resistance within the force sensing transducer assembly.

The surface might comprise a tactile button and include a clip configured to attach the force sensing transducer assembly to a common form TIG torch in a manner to allow a welder to apply force to the tactile button using a desired portion of a hand of the welder.

The force sensing transducer assembly might be a bite sensor with the surface comprising a tactile button and wherein the bite sensor further comprises a second face on an opposing side of the force sensing transducer assembly from the tactile button, and a resilient encapsulating coating surrounding the force sensing transducer assembly. The bite sensor is sized and configured for a welder to apply force by biting down on the tactile button and the second face.

In other embodiments, the force sensing transducer assembly comprises a multipurpose sensor ("puck") wherein the surface comprises a rigid top cover and including an enclosure attached to the top cover and having a bottom. The "puck" is constructed and arranged for a welder to press the rigid top cover and the enclosure between a body part and a relatively rigid barrier (such as a wall, a floor, or another body part) in order to apply force to the top cover.

The transmission medium might be wired, wireless, or both. The force sensing transducer assembly could include an array of force sensing transducers.

Force sensing control apparatus for a welding machine includes means for sensing force applied by a body part of a welder, means for generating a force signal based upon the sensed force, means for generating a control signal based upon the force signal, and means for controlling a parameter of a welding machine based upon the control signal. If the parameter is the output power of the welding machine it could include means for setting the minimum amount of force to configure the control signal to actuate the welding machine and means for setting the maximum amount of force that will configure the control signal to increase the output power of the welding machine. It could also include means for indicating to a welder the control signal state.

The method of controlling an operation parameter (such as output power, voltage, amperage, MIG wire feed speed, or gas flow rate) of a welding machine includes the steps of sensing the amount of force applied by a body part of a welder to a surface, generating a force signal based upon the amount of sensed force, generating a control signal based upon the force signal, and controlling an operation parameter of the welding machine based upon the control signal. The method may include the step of setting an effective range of the force signal to control the operation parameter.

DETAILED DESCRIPTION OF THE INVENTION

Figure 1:
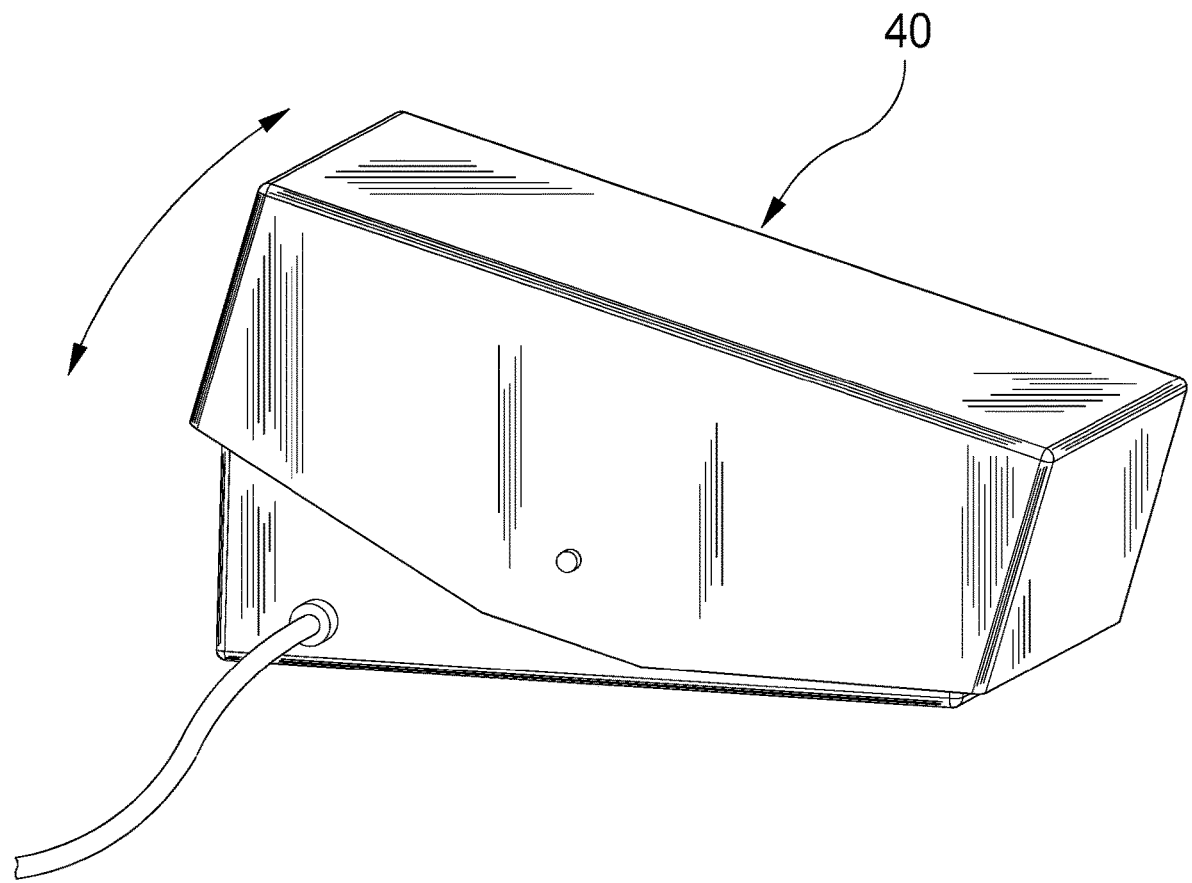
FIG. 1 (Prior Art) is a side isometric view of a prior art TIG pedal assembly for controlling a TIG welding machine.
Figure 2:
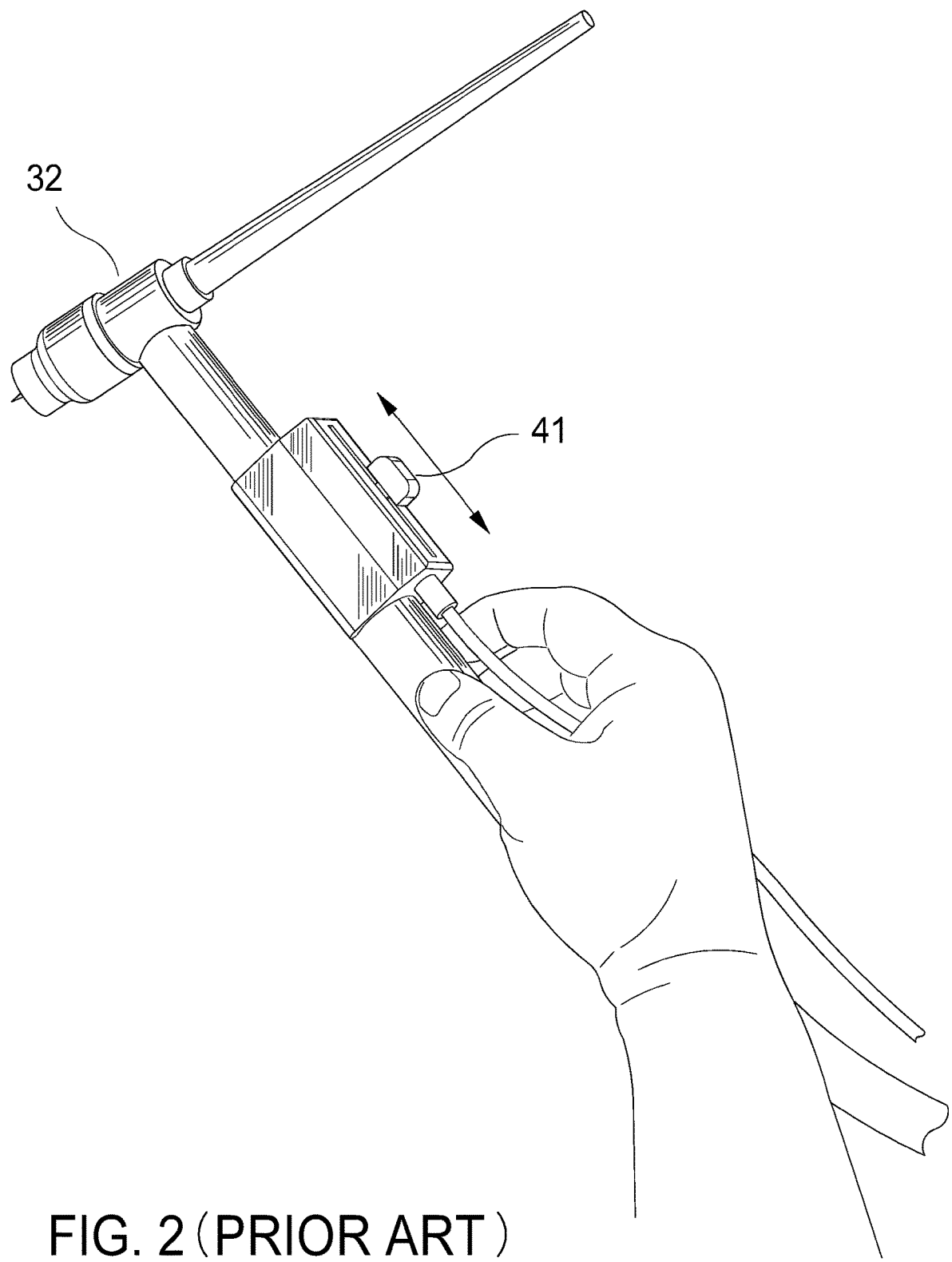
FIG. 2 (Prior Art) is a side isometric view of a common form TIG torch with a prior art TIG hand control slider button of the linear potentiometer type for controlling a welding machine.

The following table provides a list of reference numbers and associated elements for convenience.

| Ref. No. | Element |
|---|---|
| 1 | Force Sensing Transducer Assembly |
| | 1A Finger Sensor     1B Bite Force Sensor     1C Sensor in "Puck" |
| | 1D wired transducer assemblies     1E wireless transducer assemblies |

-continued

| Ref. No. | Element |
|---|---|
| 2 | Force Sensing Transducer Circuit Board |
| 3 | Semiconductive Membrane |
| 4 | Tactile Button |
| | 4A Finger Button   4B Bite Sensor Button |
| 5 | Adhesive Arc (thin film, double sided) |
| 7 | Force Sensor Cable |
| 8 | Electrical Connector |
| 9 | Circuit Board Trace Pattern (for Force Sensing Resistor type Sensor) |
| 10 | Mounting Clip |
| 11 | Resilient Actuator Button |
| 12 | Resilient Spacing and Sealing Ring |
| 13 | Multipurpose Force Sensing Transducer Module ("Puck") Enclosure |
| 14 | Bottom Cover Plate |
| 15 | Top Cover |
| 16 | Cover Retaining Screw |
| 17 | Guide Pin |
| 18 | Spacer Ring Locating Groove |
| 19 | Resilient Friction Feet |
| 20 | Control Interface Module |
| | 20A wired Control Interface Module   20B wired/wireless Control Interface Module |
| 21 | Actuation Point Sensitivity Potentiometer |
| 22 | Maximum Force level Potentiometer |
| 23 | LED Indicator Light |
| 24 | Power Input Jack |
| 25 | Control Signal Output Jack |
| 26 | Sensor Input Jack |
| 27 | Battery |
| 28 | Control and Wireless Transceiver board |
| 29 | Battery Compartment |
| 30 | Battery Compartment Cover |
| 31 | Rivets |
| 32 | Common Form TIG Torch |
| 34 | AC to DC Power Adapter |
| 35 | Welding Machine Remote Control Plug |
| 36 | Control Signal Output Cable |
| 37 | Remote Transceiver Unit |
| 38 | Attachment Clip |
| 40 | Prior Art TIG Pedal assembly |
| 41 | Prior Art TIG Hand Control Slider Button |
| 43 | Resilient, Waterproof Encapsulating Coating |
| 45 | Welder |
| 46 | Welding Machine |
| 47 | Transmission medium between transducer and control interface module |
| 48 | Cable transmission medium |
| 49 | Wireless Transmission Medium |
| 50 | Force |
| 52 | Electrical Force Signal |
| 54 | Control Signal |
| 56 | Sensor Array |
| 57 | Array base |
| 59 | Transimpedance Amplifier |
| 60 | Control Processor |
| | 60A wired only control processor   60B dual wired/wireless control processor |
| 61 | User Interface |
| 62 | Power within control interface module |
| 63 | Amplifier |
| 64 | Relay (on/off) |
| 65, 66 | DC Signal (part of Control Signal 54) typically 0-10 V |
| 67, 68 | Dry Contact (part of Control Signal 54) |
| 69 | DC Voltage from Control Processor |
| 70 | User Interface Signal |
| 72 | Transceiver in Control Interface Module |
| 73 | Transducer within wireless embodiments |
| 75 | Transimpedance Amplifier in Remote Module |
| 76 | Sensor Processor |
| 77 | Transceiver in Remote Module |
| 78 | Force Sensor Extension Cable |
| 79 | Force Sensor Cable Section on Remote Module |
| 80 | Control Processor/Welding Machine Communication |
| 81 | Control Processor/Wireless Module Communication |
| 82 | Remote Interface |

Figure 3:
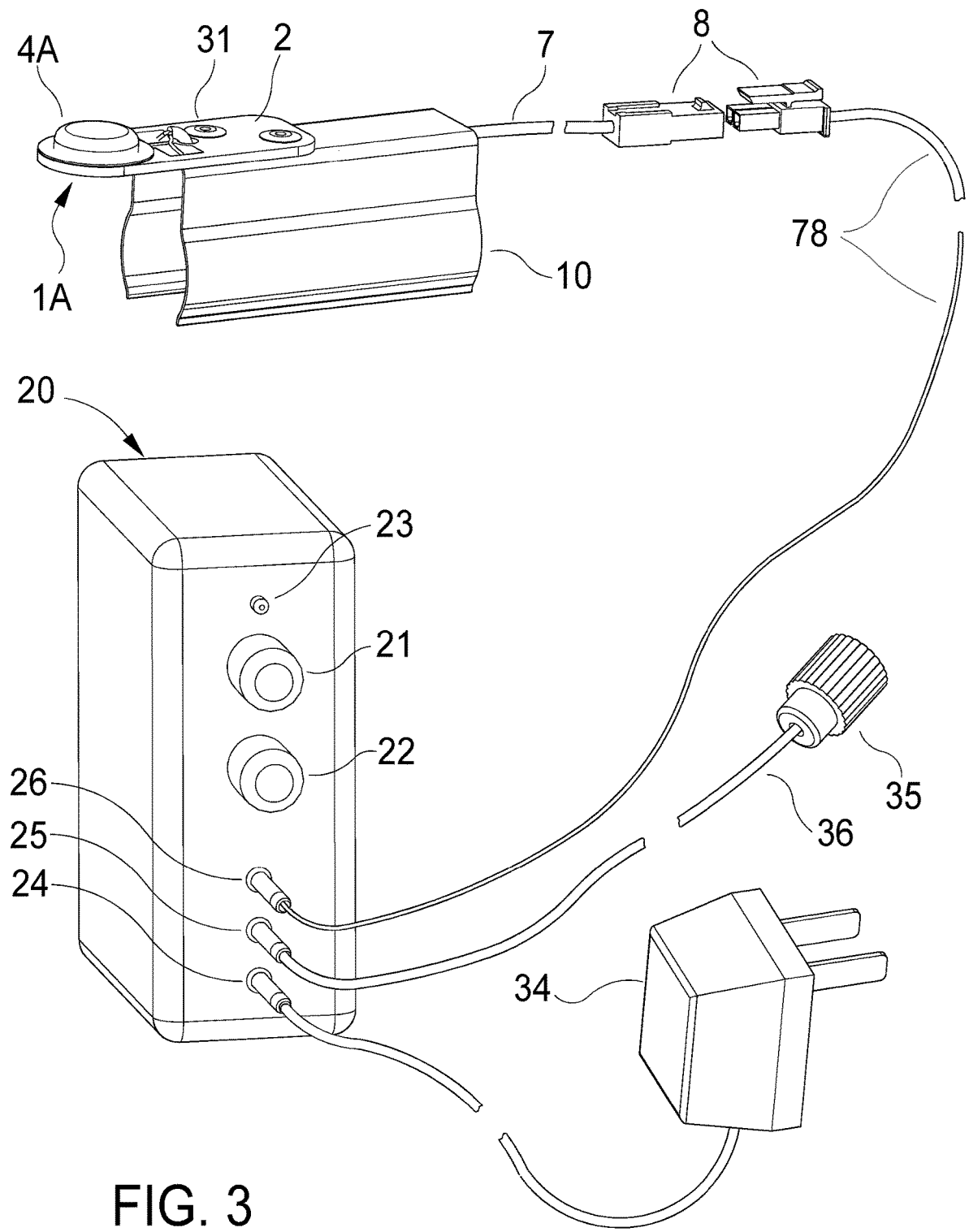
FIG. 3 is a side isometric view of a manually operated remote control system for a TIG welding machine including a force sensing transducer assembly in accordance with the present invention.

FIG. 3 is an isometric view of a manually operated remote control system for a TIG welding machine 46 (shown in FIGS. 11-13) in accordance with the present invention, illustrating a force sensing transducer input device 1A of the variable resistance type, in this example attached to circuit board 2 riveted 31 to a mounting system 10 for attaching to a TIG welding torch 32 (shown in FIG. 5), a system of connecting cables and connectors, a control interface module 20, a connecting cable 36 and connector 35 for connection to a welding machine via control signal output jack 25 and a AC to DC power adapter 34 providing power to control interface module 20 via power input jack 24.

Figure 4:
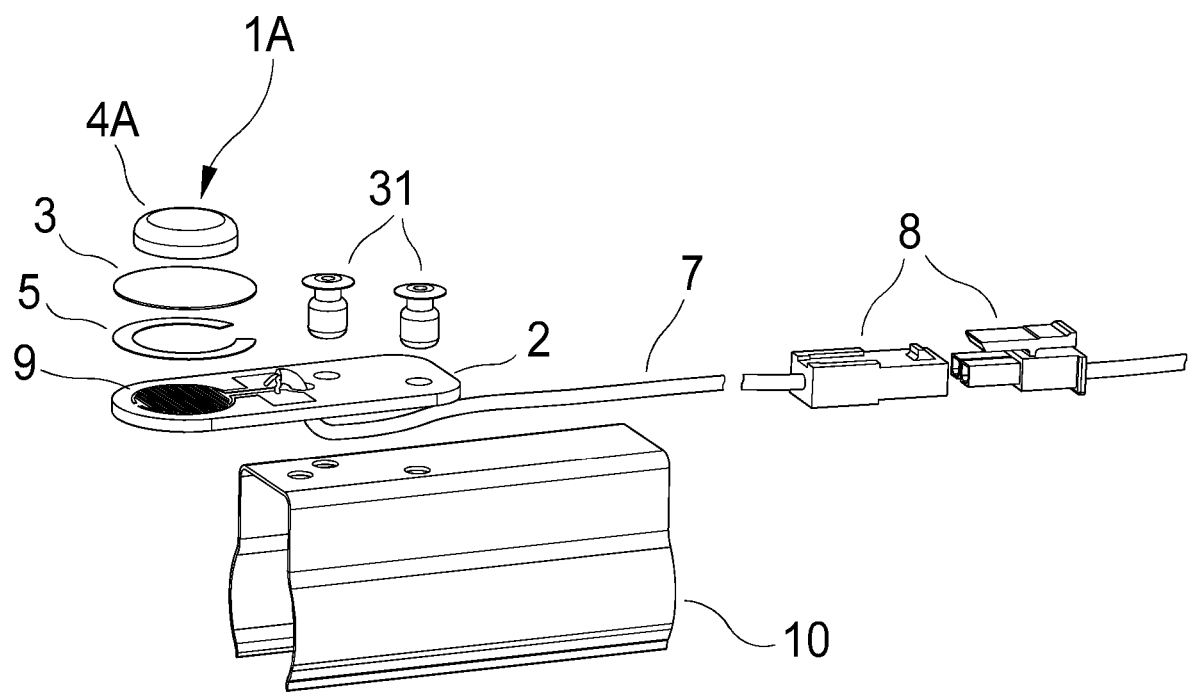
FIG. 4 is an exploded side isometric view of the force sensing transducer assembly of FIG. 3.
Figure 11:
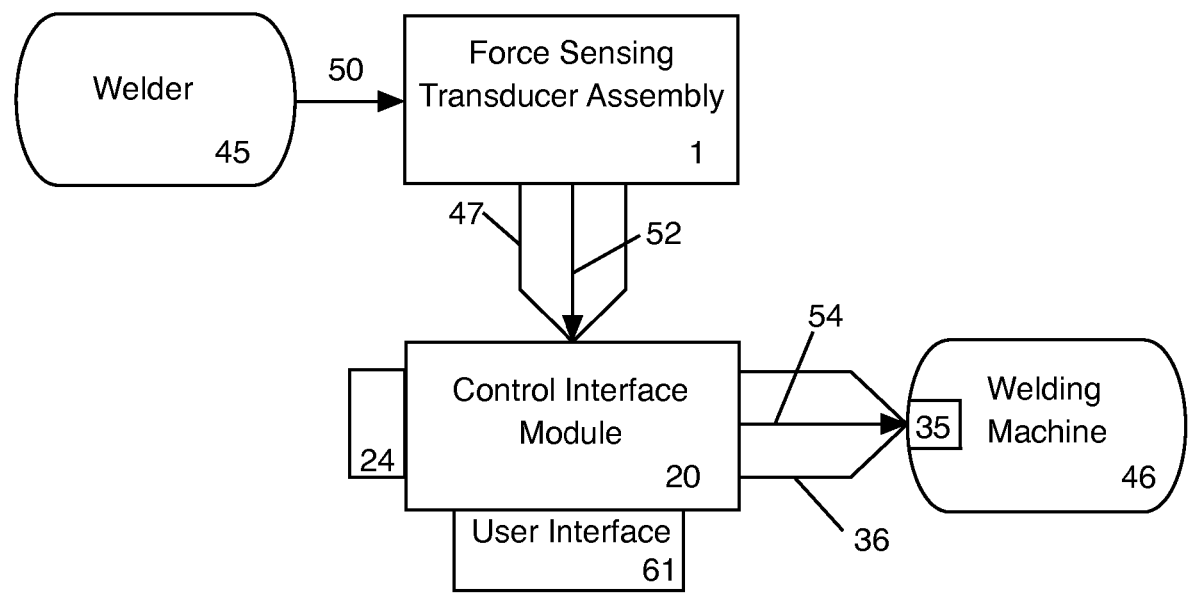
FIG. 11 is a block diagram illustrating the operation of remote, manually operated force sensing control apparatus for a welding machine according to the present invention.

Force sensing transducer assembly 1A is better shown in FIG. 4. Force sensing transducer assembly 1A is shown in use in FIG. 5. FIG. 11 provides a top-level block diagram of the system.

Briefly, a welder 45 (shown in FIG. 5) applies force 50 (shown in FIG. 11) to tactile button 4A, with the amount of force generally proportional to the desired control signal at the welding machine. Force sensing transducer 1A converts the applied pressure to an electrical force signal 52 (shown in FIG. 11). Force sensor cable 7, 78 carries force signal 52 to sensor input jack 26 of control interface module 20, for example via electrical connector 8.

Control interface module 20 generates a control signal 54 based upon force signal 52 and provides control signal 54 to welding machine 46 via control signal output cable 36 and welding machine remote control plug 35. Welding machine 46 responds to control signal 54 by turning on or off and varying the output power, and hence the heat of the welding arc.

In some preferred embodiments, control interface module 20 includes an actuation point sensitivity potentiometer 21 (for controlling the amount of force required to actuate welding machine 46) and a maximum force level potentiometer 22 (for controlling the amount of force required to maximize the welding machine output power). These two controls set the range of force required to provide the range of arc heat. It is convenient to allow the welder to set this range according to the force sensing transducer assembly used and personal preference. This may be simplified to a sensitivity selector switch. Control interface module 20 may also include one or more LED indicator lights 23 to indicate the operation of the module (e.g. LED 23 may light when the actuation point is reached and the welding machine is producing an arc). Or, green could indicate idle and yellow could indicate active, or various other indication schemes as desired.

Force sensing transducer assembly 1 may be configured much like finger sensor 1A except on its own, without mounting clip 10, so that welder 45 may use it in other locations convenient to welder 45. E.g. in a shoe. Then other attachment methods may be provided (tape, glue, hook and loop, snaps, pockets, etc.) Similarly, finger sensing transducer may be built in to TIG torch 32 (e.g. on a pistol grip), or may be attached by other means. Further, force sensing transducer assembly 1 may comprise various shapes and sizes.

FIG. 4 is an exploded view of variable resistive force sensing transducer assembly 1A, mounting clip 10, and connecting cable assembly 7, 8. In this embodiment, transducer assembly 1A comprises tactile button 4A, semiconductive membrane 3, thin film, double-sided adhesive spacer arc 5, and circuit board 2 with trace pattern 9.

In this embodiment, force sensing transducer assembly 1A comprises a backing rigid circuit board substrate 2 supporting a pattern of interlaced metallic conductive traces 9 around which is placed a spacer arc 5, which has been coated on both sides with an adhesive compound. Adhesive on one side of spacer arc 5 affixes spacer arc 5 to the circuit board so that spacer arc 5 generally concentrically surrounds the conductive trace pattern 9 on circuit board 2. Tactile finger button 4A is adhered to semiconductive membrane 3 (in this case a resistive film disk), which is concentrically aligned with and adhered to spacer arc 5 in such a manner that thin semiconductive membrane 3 is positioned facing and in close proximity to, but not in contact with, conductive trace pattern 9. These several components combine into variable resistance type force sensing transducer assembly 1A. A force applied to the surface of finger button 4A then deflects the membrane 3 in the direction of the force in such a manner that semiconductive membrane 3 is caused to come into physical contact with the surfaces of conductive trace pattern 9. As semiconductive membrane 3 contacts and bridges the space between the interleaved conductive trace elements 9, an electrically resistive circuit element is created. As force or pressure is increased, more of semiconductive membrane 3 is forced into contact with corresponding locations upon the conductive traces patterns 9 which in turn allows more semiconductive pathway area to be available to the circuit. This has the effect of lowering the overall resistance of the circuit element in generally inverse response to pressure applied to the finger button 4A.

In this embodiment, force sensing transducer assembly 1A which is locally affixed in some manner to the TIG welding torch, is then coupled by means of a multiconductor electrical cable 7 to control interface module 20 which generally would be located in close proximity with welding machine 46 to be controlled. Note that while control interface module 20 is shown as a separate unit in FIG. 3, it could be built into welding machine 46. A separate unit is especially useful in a retrofit situation.

Figure 12:
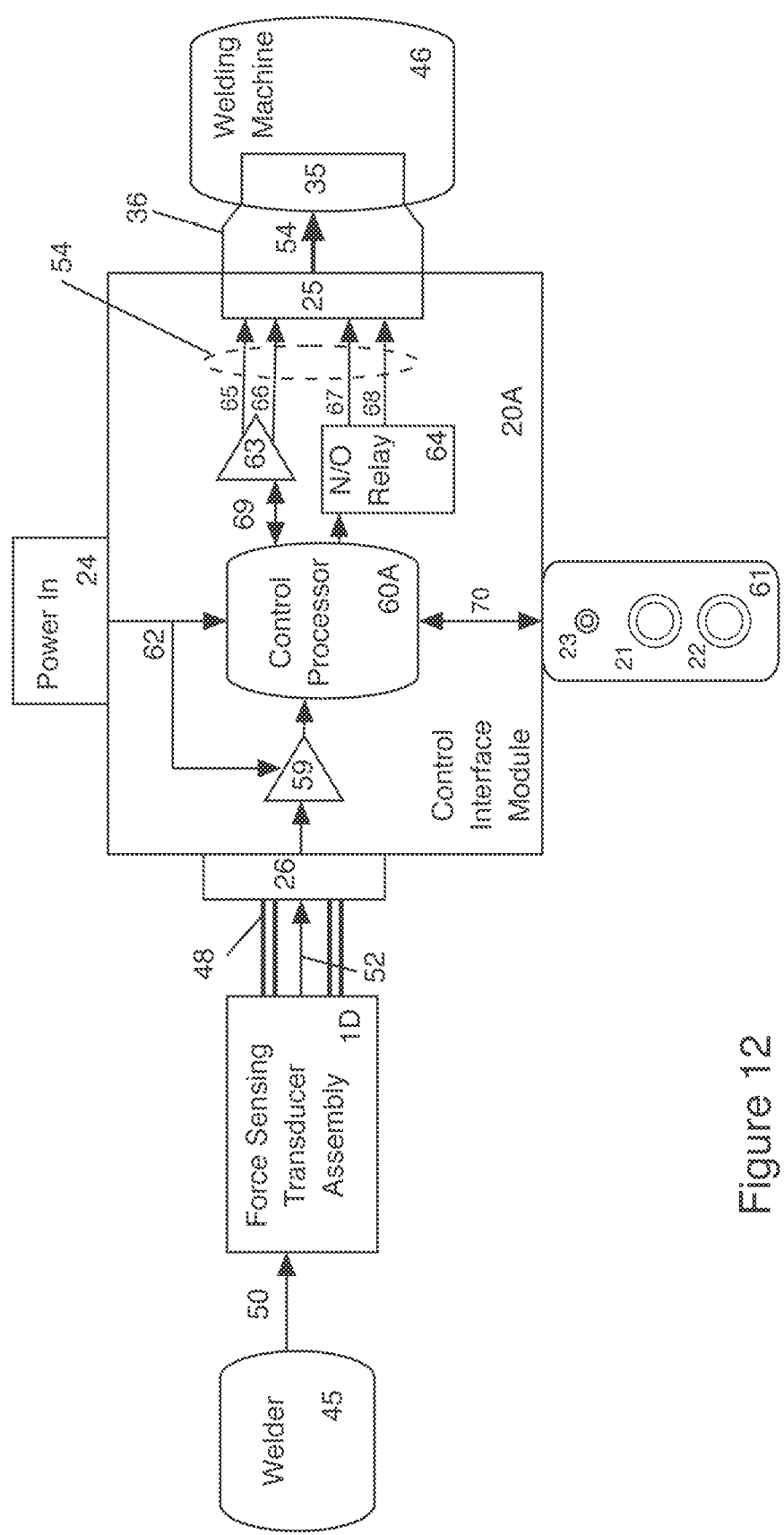
FIG. 12 is a block diagram illustrating the operation of a remote, manually operated force sensing control apparatus for a TIG welding machine, with a wired interface.
Figure 13:
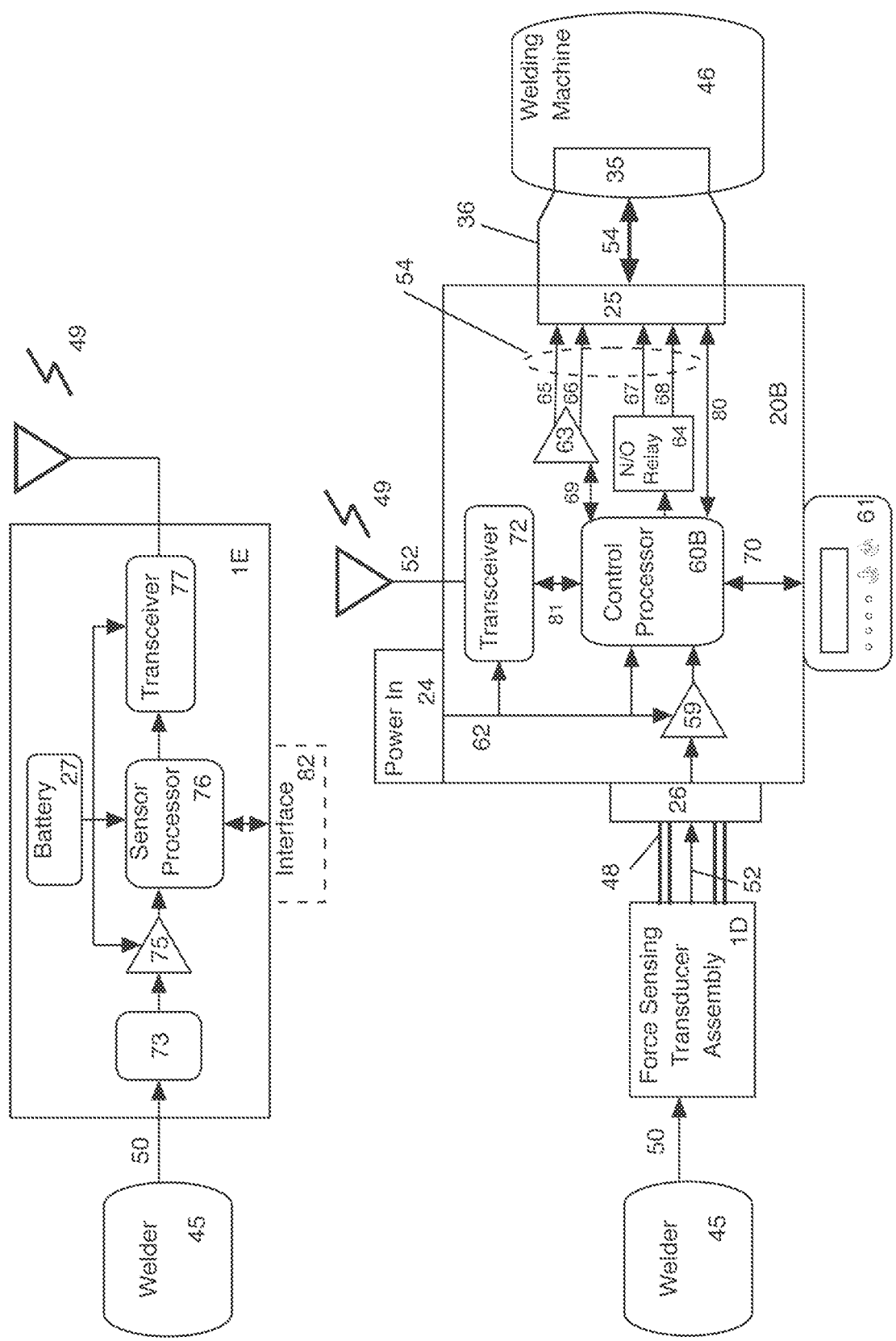
FIG. 13 is a block diagram illustrating the operation of a remote, manually operated force sensing control apparatus for a TIG welding machine, with a wireless interface.

Variable resistance output from force sensing transducer assembly 1A is then coupled into control interface module 20. Note that force sensing transducer assembly 1A could be of various types, e.g. capacitive or optical transducers. Control interface module 20 in this preferred embodiment incorporates the force sensing transducer's variable resistance as an integral component of an electronic control circuit. This comprehensive control circuit produces by means of various amplifiers, converters and microprocessors, as well as additional control inputs from, for example, potentiometers which may be located at the control interface module, a corresponding output signal suitable to control desired operating parameters of a welding machine. FIGS. 12 and 13 show examples. Those skilled in the art will appreciate that I/O could be in many other useful forms, such as numeric displays, different or additional light indicators, BLUETOOTH™ format, etc. In particular, user interface 61 will likely include different controls and indicators if remote interface 82 is provided, as in the embodiment of FIG. 13. One convenient feature allows welder 45 to set the minimum and maximum power output of welding machine 46 at remote interface 82 (or for that matter at user interface 61), rather than at welding machine 46. Or, welder 45 could select whether a bite sensor, finger sensor, or puck sensor is being used if these are processed differently.

In some embodiments, force sensing transducer assembly 1A, mounting clip 10 and some predetermined portion of communications cable, if desired, are encapsulated within a conformal film (not shown) of a flexible protective material to provide environmental and physical protection as well as additional electrical insulation from stray high voltage, electrical fields which may be produced by the welding machine. The encapsulation material may be any suitable polymer, PVC, polyester resin, acrylic resin, epoxy resin, silicone resin, various rubber compounds, particularly polyurethane rubber.

Figure 5:
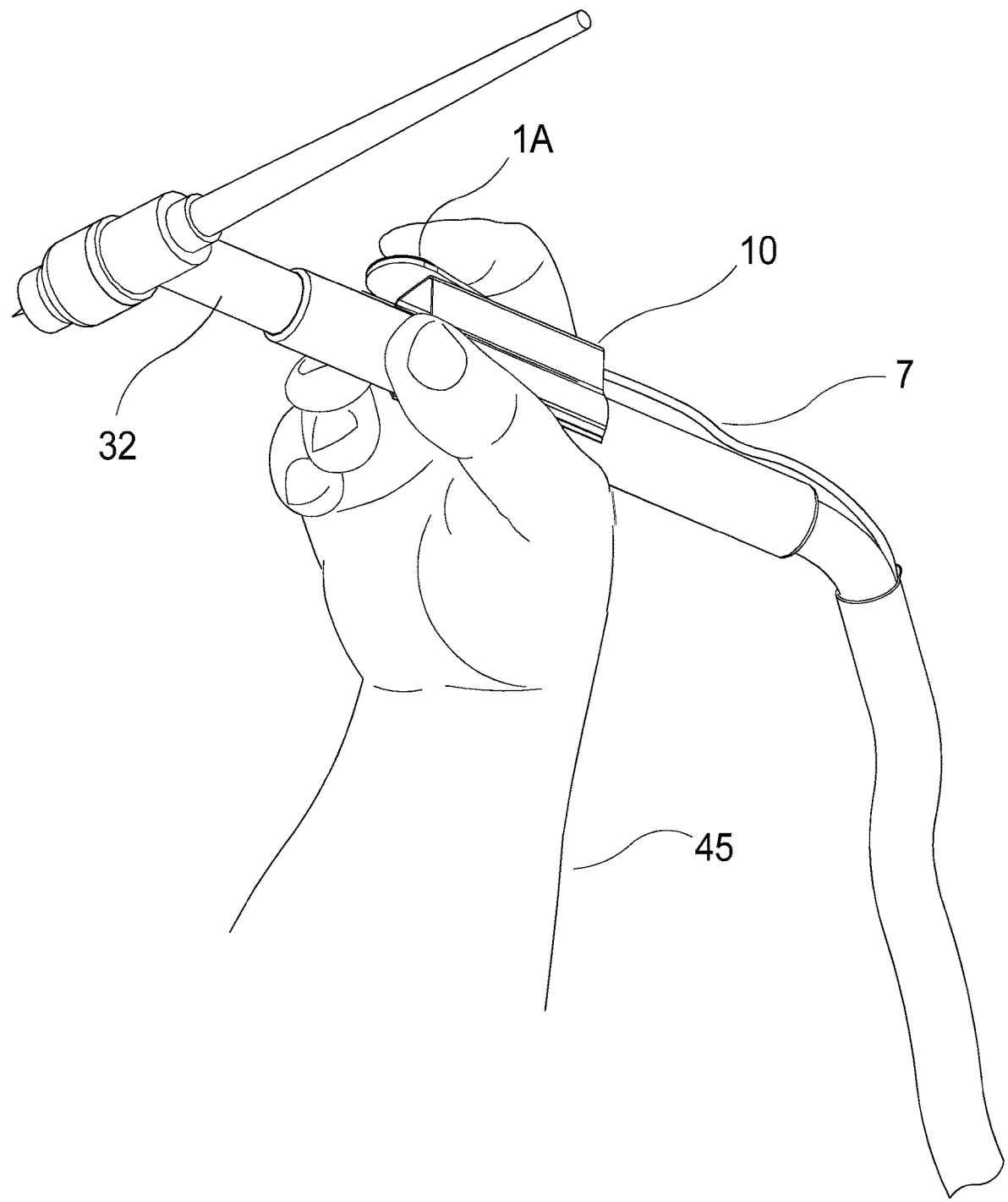
FIG. 5 is a side isometric view of a common form TIG torch including a force sensing transducer assembly in accordance with the present invention.

FIG. 5 shows a common form TIG torch 32 held by a welder 45 with the welder's forefinger in place upon tactile button 4A of force sensing transducer assembly 1A. The welder's finger does not need to be moved from a fixed location to actuate force sensing transducer assembly 1A while the welder's hand provides support for TIG welding torch 32. In this embodiment, force sensing transducer assembly 1A is attached to TIG torch 32 with mounting clip 10, and hence is removable. In addition, the location of force sensing transducer assembly 1A may be adjusted by rotating or sliding clip 10. This allows welder 45 to use a desired finger, thumb or other part of the hand to apply force to force sensing transducer assembly 1A.

In use, welder 45 presses force sensing transducer assembly 1A with sufficient force to actuate welding machine 46. Welder 45 then increases the force until the desired arc heat is achieved, up to the maximum available. The actuating force and the force required to reach the maximum may be set by actuation point sensitivity potentiometer 21 and maximum force level potentiometer 22 as shown in FIG. 3.

In a preferred embodiment, force sensitive transducer assembly 1A is affixed to a formed metallic, plastic or composite, spring tensioned mounting clip 10 designed to fit co-axially and in close proximity to the commonly cylindrical form handle portion of a TIG welding torch 32, thus providing a secure, but easily positioned and relocated means of attaching force sensitive transducer assembly 1A to welding torch 32. Force sensitive transducer assembly 1A is affixed to the body of TIG welding torch 32 in such a location which facilitates simple application of the welder's finger or thumb pressure to that transducer in a comfortable way. Of course, multiple designs in the specific means of mounting the force sensitive transducer to a welding torch can be envisioned, constrained in some embodiments by the need to adapt the mounting of the force sensitive transducer to fit a wide variety of welding torches. Any of several various schemes for mounting the force sensitive transducer may be applicable here as may suit the particular welder's requirements.

Figure 6:
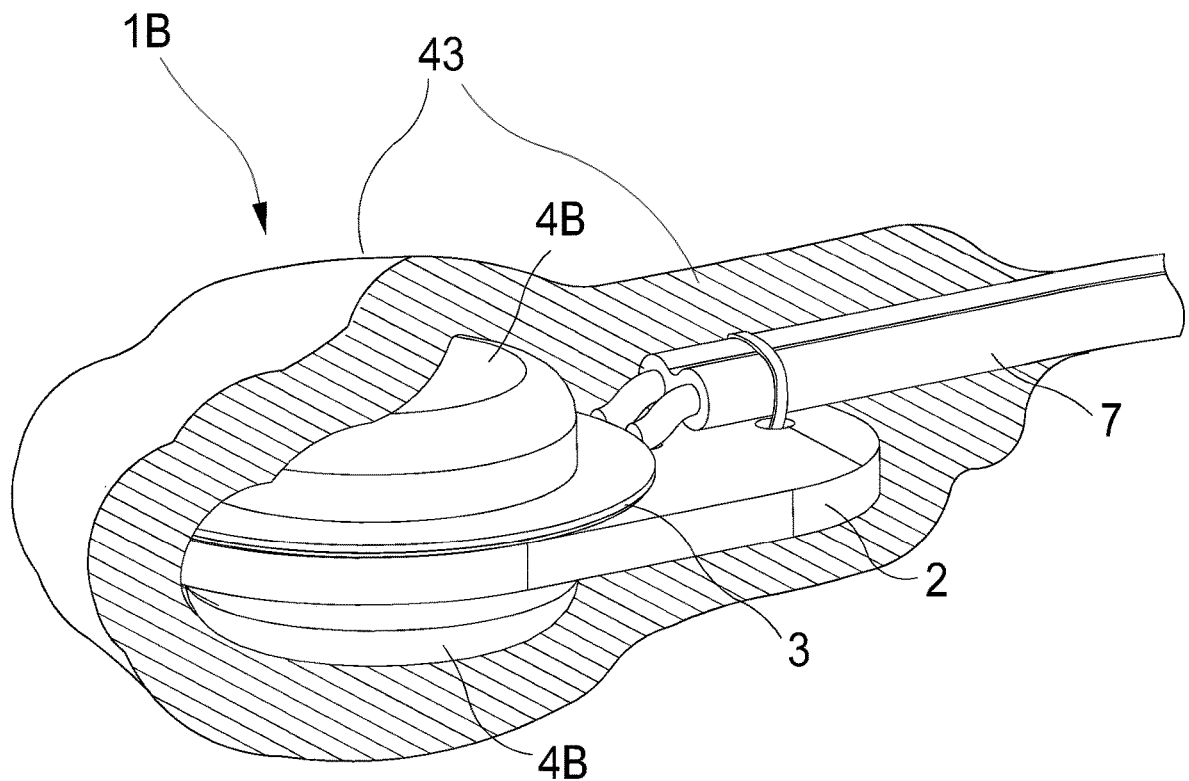
FIG. 6 is a side cutaway isometric view of an encapsulated force sensing transducer assembly having tactile buttons on opposing primary surfaces in accordance with the present invention.

FIG. 6 shows bite force sensing transducer assembly 1B having tactile buttons 4B on both the opposing primary surfaces of circuit board 2 and encapsulated within a protective coating 43 of a resilient, waterproof material facilitating intended use as a bite force sensor for remote control of a TIG welding machine 46. Force sensing transducer assembly 1B is very similar in construction and operation to force sensing transducer assembly 1A, as shown in FIG. 7.

Figure 7:
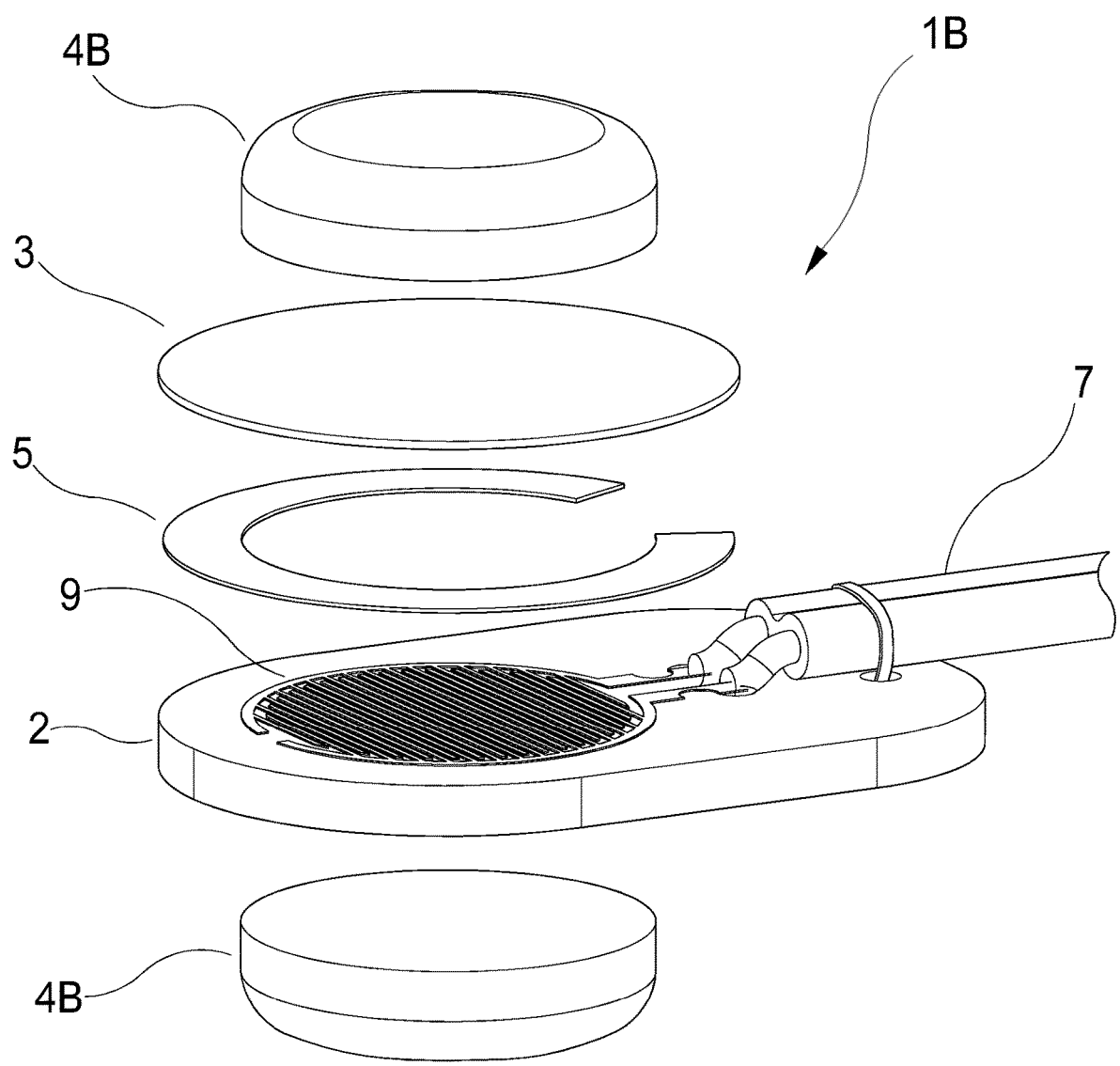
FIG. 7 is an exploded side isometric view of the force sensing transducer assembly of FIG. 6.

FIG. 7 shows an exploded view of bite force sensing transducer assembly 1B. Like force sensing transducer assembly 1A, it includes adhesive spacer arc 5 which attaches circuit trace pattern 9 to semiconductive membrane 3, while keeping them from touching when no force is being applied to top tactile button 4B. It also includes a bottom tactile button 4B for comfort and convenience when used as a bite force sensor. In this embodiment, there is no separate sensing of the force applied to bottom tactile button 4B, though that could be included if desired. As shown in FIG. 6, a resilient, waterproof protective coating 43 may be applied to this embodiment, which is convenient in the bite force scenario.

Figure 8:
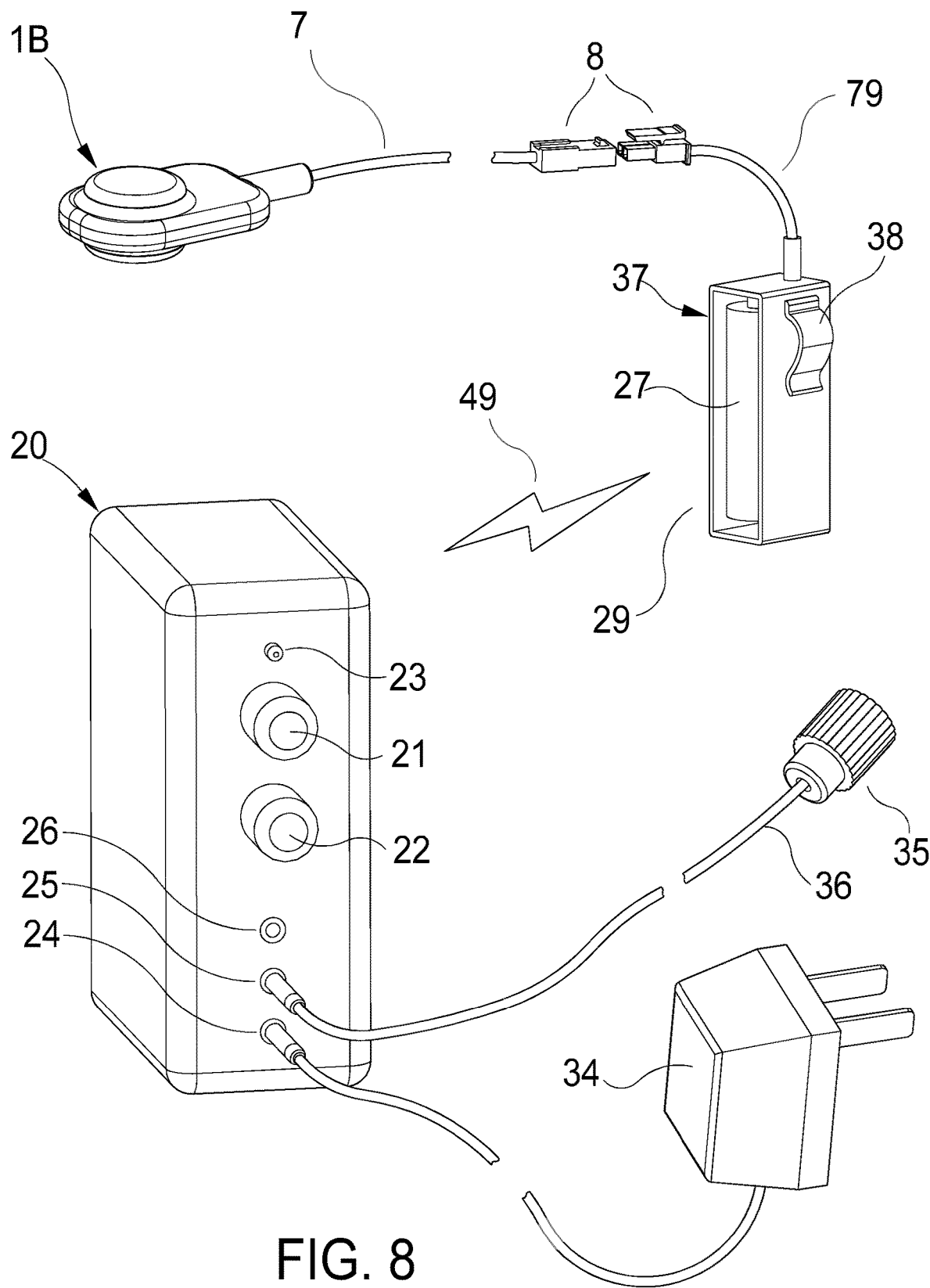
FIG. 8 is a side isometric view of a manually operated remote control system for a TIG welding machine including a force sensing transducer assembly such as that shown in FIGS. 6 and 7.

FIG. 8 shows bite force type sensor assembly 1B coupled by means of cables 7, 79 and connector 8 with remote transceiver 37 and then via RF wireless connection 49 with control interface module 20. Also shown is cable 36 to provide connection between control interface module 20 and welding machine 46 via welding machine remote control plug 35. Power is supplied via AC power adapter 34. As an alternative, transceiver 37 could be a transmitter instead, with transceiver 72 being a receiver.

Figure 9:
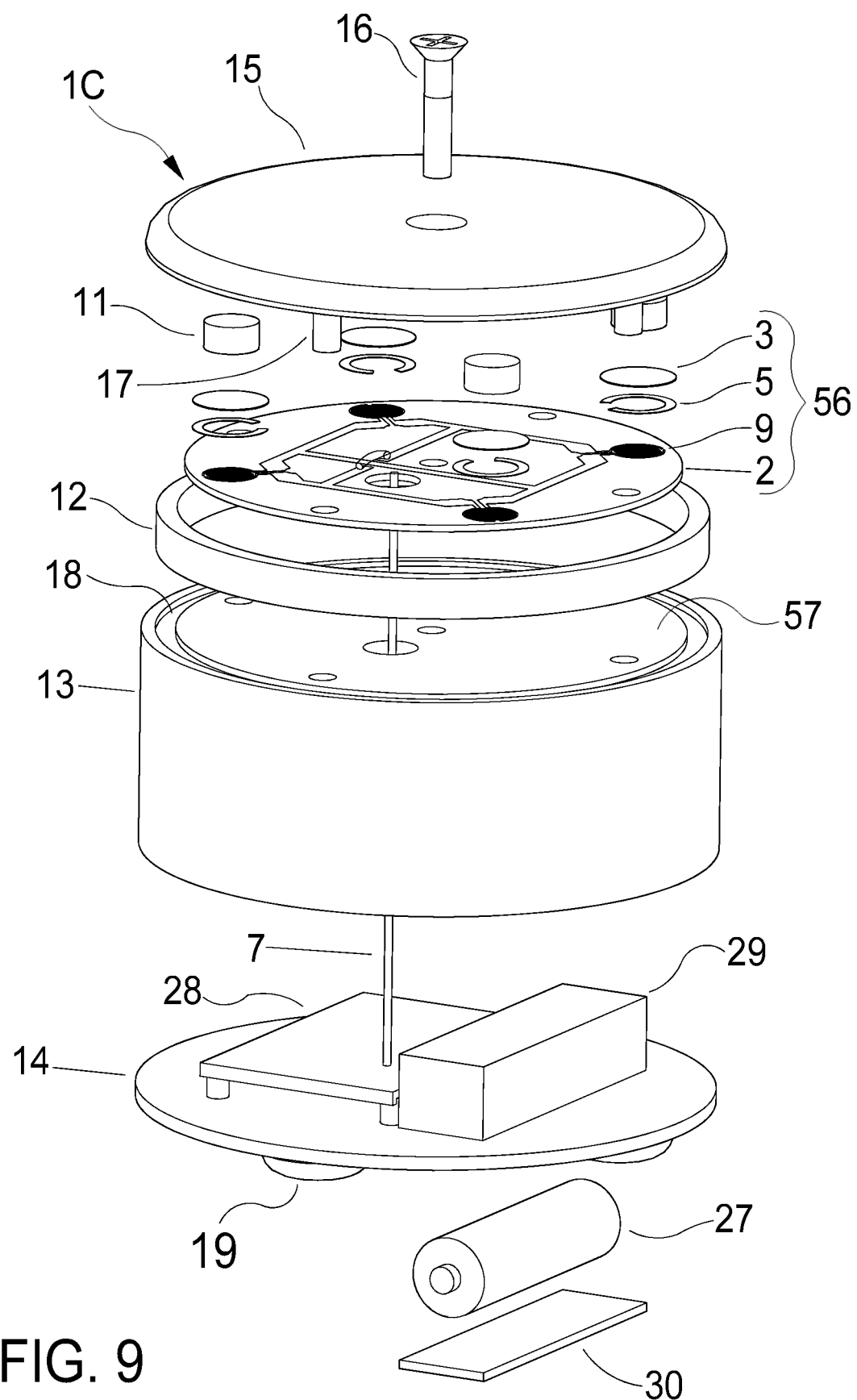
FIG. 9 is a side cutaway isometric view of a force sensing transducer assembly "puck" in accordance with the present invention.

FIG. 9 is an exploded view of a third embodiment of a force sensing transducer assembly. It comprises a multipurpose force sensing transducer module 1C, herein called a "puck", showing force sensing resistors, actuating components, housing and sealing components, transceiver control board, battery housing and top and bottom plates.

In the embodiment of FIG. 9, Multipurpose Force Sensing Transducer Assembly 1C ("puck") is shown with top cover 15, module enclosure 13 having a cylindrical form and an array base 57, and forming a central, open cylindrical enclosure space extending axially downward from array base 57 to meet bottom cover 14. Circular sensor array 56 comprises circuit board 2 with trace patterns 9, spacer arcs 5, semiconductive membranes 3, and resilient actuator buttons 11. Circular design sensor board 2 has thereupon several conductive sensor trace patterns 9 arrayed in a radial pattern, evenly spaced and equidistant from the central axis point of sensor board 2. Sensor board 2 is positioned concentrically adjacent to array base 57 in such a manner that trace patterns 9 are facing toward top cover 15. Adhesive spacer arcs 5 and semiconductive membranes 3 are affixed to sensor board 2 in positions corresponding with the conductive trace patterns, and are positioned to create an array 56 of force sensing transducer areas. Actuating buttons 11 of resilient material are then secured to the exposed surfaces of semiconductive membranes 3 by means of an adhesive. Resilient sealing ring 12 is placed between top cover 15 and array base 57 of module enclosure 13 and concentrically surrounds the circular sensor array 56. Top cover 15 is of a solid structural material such as aluminum and has a diameter matching that of module enclosure 13 and a thickness sufficient to provide rigidity. Top cover 15 is fitted with one or more guide pins 17 extending for a distance from its bottom face which pass through corresponding holes in circuit board 2 and in array base 57. A screw 16 is provided to secure top cover 15 to the module enclosure 13.

Module enclosure 13 is attached to bottom cover 14 and encloses control and wireless transceiver board 28 and battery compartment 29 with battery 27 and battery cover 30. Force sensor cable 7 connects wireless transceiver board 28 and circuit board 2, and carries force signal 52 for transmission to control interface module 20 via wireless interface 49 as shown in FIG. 10.

In this embodiment, control and wireless transceiver board 28 receives variable resistance input signals from the force sensing transducers and in turn generates and transmits an RF signal to control interface module 20. Bottom cover plate 14 comprises a rigid plate of a structural material such as aluminum, and is fitted with a battery compartment 29 and provides a mounting surface for control and wireless transceiver board 28. Bottom cover 14 is attached to module enclosure 13 by, for example, screws (not shown). Resilient feet 19 may be applied as desired to the exterior surface of bottom cover 14 to provide stability on a variety of possible work surfaces. Finally battery 27 is provided for powering control and wireless transceiver board 28, and battery compartment cover 30 is provided to retain battery 27.

"Puck" 1C is intended to allow welder 45 to squeeze puck 1C between a body part and a relatively rigid barrier (which could be a wall, a floor, another body part, etc.). For example, welder 45 might step on top cover 15 with "puck" 1C on the floor. Or, welder 45 might squeeze "puck" 1C between his knees (the second knee is the barrier in this case). Or, the welder might press "puck" 1C between an arm and a wall or an arm and his body, etc.

Figure 10:
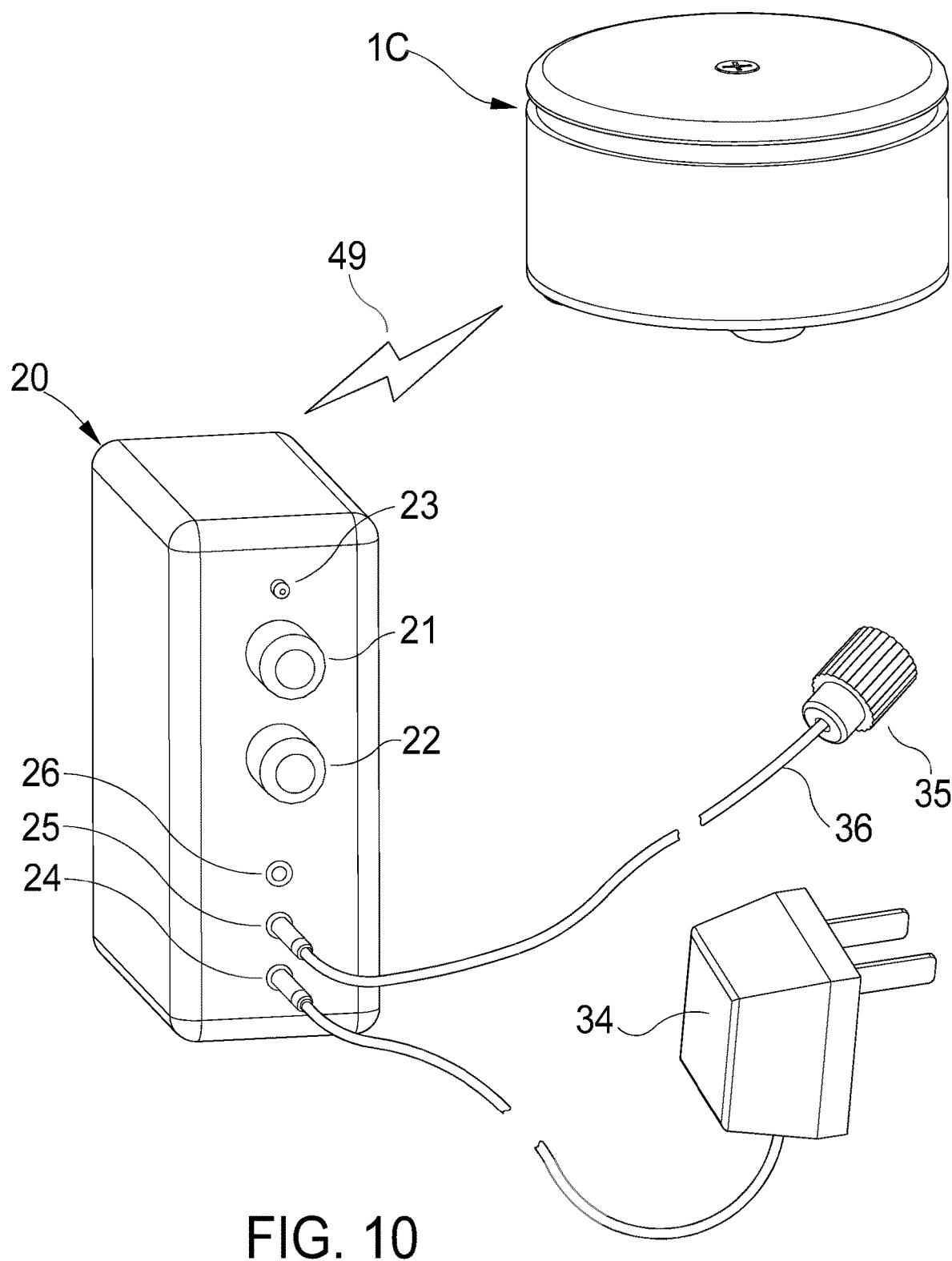
FIG. 10 is a side isometric view of a manually operated remote control system for a TIG welding machine including a force sensing transducer "puck" such as that shown in FIG. 9.

FIG. 10 shows force sensing transducer assembly 1C with wireless interface 49 to control interface module 20. Also shown is cable 36 used to connect the control interface module with welding machine 46 via welding machine remote control plug 35 and AC adapter type power supply unit 34.

FIG. 11 is a top-level block diagram illustrating the structure and operation of remote, manually operated force sensing control apparatus for welding machines according to the present invention. Welder 45 applies force 50 to a force sensing transducer assembly 1 (e.g. finger sensor 1A, bite force sensor 1B or sensor in "puck" 1C). Force sensing transducer assembly 1 generates a force signal 52 based upon force 50 and transmits force signal 52 to control interface module 20 via transmission medium 47. Control interface module 20 generates a control signal 54 based on force signal 52 and provides control signal 54 to welding machine 46. Note that control signal 54 will likely comprise two or more signals as shown in FIGS. 12 and 13. The term "control signal 54" generally comprises whatever signals are used.

Force sensing transducers convert applied physical force 50 into an electrical property, such as a change in resistance, capacitance, etc. Multiple transducers may be connected in parallel or series to allow multiple control points. This electrical property is then converted into force signal 52. Force signal 52 is based upon force 50, and is generally approximately proportional to force 50.

Transmission medium 47 may be wired (such as coaxial cable as shown in FIG. 12) or wireless (such as radio signal 49 shown in FIG. 13, optical signals, etc.).

FIG. 12 is a block diagram illustrating the operation of one embodiment of a remote, manually operated force sensing control apparatus for a TIG welding machine, with a wired interface. Welder 45 applies force 50 to force sensing transducer assembly 1D (e.g. finger sensor 1A or bite force sensor 1B), which generates force signal 52 and provides it to control interface module 20A via coaxial cable 48 (cable 7 in FIG. 3). Control interface module 20A comprises transimpedance amplifier 59, processor 60A, amplifier 63, and relay 64. Power 62 is provided via power input jack 24 (see FIG. 3). Processor 60A communicates with user interface 61. This could comprise the potentiometers 21, 22, and LED 23 shown in FIG. 3, for example. For convenience, jacks 24, 25, 26 might be located here as well, since welder 45 would be making use of them.

Transimpedance amplifier 59 comprises an operational amplifier and low pass filter, and acts to convert the resistance in force sensing transducer assembly 1D into voltage and reduce noise. As shown, force signal 52 is the resistance within force sensing transducer assembly 1D. Force sensing transducer assembly 1D does not require power other than the current flowing through it from transimpedance amplifier 59. As an alternative, transimpedance amplifier 59 could be considered to be part of force sensing transducer assembly 1, and force signal 52 would be voltage.

Transmission medium 47 is, for example, a simple two-conductor shielded cable such as flexible audio coax 7. Connector 8 and jack 26 in FIG. 3 allow cable 7 to be easily replaced.

Processor 60A generally includes analog to digital conversion capability to convert the voltage signal from transimpedance amplifier 59 into a digital signal. Amplifier 63 is a simple non-inverting op-amp which converts the voltage 69 from processor 60A to the voltage range required by welding machine 46 (e.g. 0-10V) and provides the voltage to welding machine 46 via lines 65, 66. Relay 64 provides dry contact to turn on welding machine 46 via lines 67, 68.

Force sensing transducer assembly 1D is preferably very robust in the presence of EMI surges, environmental contaminants, impact, drop, and other mishandling. It might include a resistive force transducer similar to Sensitronics half inch shuntmode FSR or Interlink FSR® 402, which is the type that reduces resistance as more force is applied to a minimum of several hundred ohms. (A lower resistance may be detected as a fault if desired.) Preferably the transducer is built onto a circuit board 2 for rigidity with a short dangling cable 7 with connector 8. Multiple transducers can be paralleled for multiple control points if deemed useful.

The transmission medium is simple 2 conductor shielded cable (e.g. flexible audio coax). A connector is supplied at each end to allow cable 78 and transducer 1A to be easily replaced as needed. Transimpedance amplifier 59 is simply an operational amplifier (op-amp) used as a Transimpedance Amplifier to convert transducer resistance to voltage, followed by a low pass filter to reduce actions due to noise. An appropriate surge suppressor is preferably provided across these 2 wires at the control interface module 20 end. Processor 60A is a type that has a built-in multiplexed ADC to measure the voltage out of Transimpedance amplifier 59.

As discussed in relation to FIG. 3, part of the input into control interface module 20 is from user interface controls such as two potentiometers 21, 22. Actuation point sensitivity potentiometer 21 is used to set the desired turn on force and Maximum force level potentiometer 22 is used to set the amount of force for full power. The potentiometers are wired to provide 0 to processor supply voltage (Vcc) which is provided as user interface input signal 70 to processor 60A. The applied force measurement is compared to user interface input signal 70. Simple geometry uses the turn on point and maximum force to calculate the slope. The slope is used to calculate the value for a built-in PWM module in processor 60A (if used). The PWM output is low pass filtered (not shown) to generate a DC input signal 69 to amplifier 63. A DAC could be used if the processor has one. Amplifier 63 is a simple non-inverting op-amp with an appropriate gain to convert the 0 to Vcc signal 69 from processor 60A to a 0 to 10 VDC signal (with optional switch to select 0 to 5 VDC output) to control welding machine 46. An appropriate surge suppressor is generally provided across these wires 65, 66.

When the force exceeds the desired turn on force, relay 64 is activated. A small amount of hysteresis is preferably added to the processor code to reduce relay chatter when turning on (this could also be provided via hardware). If the force exceeds the maximum desired force, then the DC output is set to maximum. A bicolor LED 23 may be provided as feedback to welder 45. Green indicates the control unit is active and ready to use. Yellow indicates the relay is on and welding machine 46 should be active. A simple wall mount power adapter 34 may be used for power with additional regulator for Vcc. Reverse polarity protection and surge suppression may be provided. Power may also be obtained from welding machine 46 if provided.

FIG. 13 is a block diagram illustrating the operation of a remote, manually operated force sensing control apparatus for a TIG welding machine, with a wireless interface and an optional wired interface. It is often useful for welder 45 to have the option to provide force signal 52 to control interface module 20B wired or wirelessly. Control interface module 20B is shown with that capability.

In wireless mode, force sensing transducer assembly 1E must include elements to allow wireless transmission (see, for example, sensor in "puck" 1C in FIG. 9). In this embodiment, force sensing transducer assembly 1E comprises a force transducer 73 (e.g. sensor array 56 in FIG. 9), battery power 27, transimpedance amplifier 75, sensor processor 76, and transceiver 77. Welder 45 applies force 50 to force transducer 73 within force sensing transducer assembly 1E. Transimpedance amplifier 75 converts transducer 73 resistance to voltage and low-pass filters the signal. Sensor processor 76 sends that value, along with other data such as battery 27 voltage and an identification code to transceiver 77, which transmits force signal 52 and any other data provided to control interface module 20B.

Control interface module 20B includes transceiver 72, which receives force signal 52 and any other data provided, and provides it via control interface/wireless module communication 81 to control processor 60B. Control processor 60B, amplifier 63, relay 64, and user interface input signal 70 all operate similarly to the same elements in FIG. 12, except that control processor 60B may receive force data from either transceiver 72 or transimpedance amplifier 59. Thus, if control interface module 20B includes the capability to receive wired input as well (as shown here) transimpedance amplifier 59 is provided to receive data via cable 48.

Those skilled in the art will appreciate that many other control interface module embodiments are possible. For example, a control interface module may be built into welding machine 46. Or, a control interface module may be designed to operate with only a wireless force transducer assembly 1E.

In the embodiment of FIG. 13, dual resistive force sensing transducer assemblies 1D and 1E (one radio and one wired) are provided. Force sensing transducer assembly 1E includes force transducer 73 and circuitry for transmitting force signal 52. Battery 27 powers this circuitry. Preferably, a convenient method for changing rechargeable batteries is provided. Transimpedance amplifier 75 converts transducer 73 resistance to voltage, and low-pass filters the voltage. Sensor processor 76 generally has a built-in ADC to measure that voltage and generate the force signal. Sensor processor 76 sends that value, along with the battery voltage and a unique ID to transceiver 77. The transceiver wraps the data in a robust 2-way protocol (e.g. Nordic Shockburst™, Semtech LoRa™, or a protocol residing in transceiver 77) and sends the packet. As an alternative, a 1-way protocol could be used.

In a preferred embodiment, a two-conductor flexible cable connects transducer 1D to a module containing the rest of the circuitry, to allow elements to be changed out as needed. An appropriate surge suppressor may be provided across the two wires in this cable. In general, the range of transceiver 77 does not need to be great, as welder 45 cannot be any farther from the welding machine (where the control box is) than the feed cable allows (typically 25 feet). Short range helps reduce possible interference from other nearby welders using the same system. The sensor processor may go into battery save mode if force transducer 1D or 1E is not pressed for a while.

Transceiver 72 within control interface module 20B matches with transceiver 77 within force sensing transducer assembly 1E. Data is passed to control processor 60B via messages. Welder 45 may pair his force sensing transducer assembly 1D or 1E with the desired control interface module 20B if necessary. LEDs and buttons may be provided in user interface 61 to aid in the pairing.

When welder 45 operates in wired mode in the embodiment of FIG. 13, force sensing transducer assembly 1D is connected to a two conductor shielded cable 7 (e.g. flexible audio coax). A releasable connector 8 is generally supplied at each end to allow cable 78 and force sensing transducer assembly 1D to be easily replaced as needed. Transimpedance amplifier 59 converts force sensing transducer assembly 1D resistance to voltage, followed by a low pass filter to reduce actions due to noise. An appropriate surge suppressor is across these two wires at the controller end. Control processor 60B is (for example) a type that has a built-in multiplexed ADC to measure the voltage out of the op-amp.

After conversion, it is often convenient to assure that the voltages out of transimpedance amplifier 59 are similar to the values sent by force sensing transducer assembly 1D or 1E at similar desired forces.

As in the case of the embodiment shown in FIG. 12, input 70 to control processor 60A may be provided via user interface 61. This allows welder 45 to set the desired turn on force and the maximum force for full power.

The embodiment of FIG. 13 also may include a remote interface 82, located at or near wireless transducer assembly 1E. Remote interface 82 is particularly useful in wireless embodiments, but may also be used in wired embodiments. Generally, communication (via 80, 81) between welding machine 46 and wireless transducer assembly 1E will be two-way, so that remote interface 82 can display welding machine 46 status (e.g. welding machine arc current).

Note that elements 59 and 75 are transimpedance if the sensor is of the force sensing resistor type. Other types of sensors use different sorts of amplifiers. Optical sensors may need a time measuring device while capacitive sensors use capacitance-to-voltage (or -frequency) conversion.

While the exemplary preferred embodiments of the present invention are described herein with particularity, those skilled in the art will appreciate various changes, additions, and applications other than those specifically mentioned, which are within the spirit of this invention. For example, bite force sensing transducer assembly 1B or force sensing transducer assembly 1C may be connected by wire to control interface module 20, while force sensing transducer assembly 1A may be connected wirelessly.

Control signal 54 may be a voltage signal within a range other than 0 to 10V depending on the requirements of the welding machine, or may be via a digital potentiometer or the like. Often welding machines include a potentiometer controlled by a foot pedal, so if convenient the present invention could include a servo to control this potentiometer remotely (three wires may be required in some cases). Remote interface 82 may include display status of welding machine 46, output parameters (such as voltage, amperage, MIG wire feed speed, or gas flow rate), user settings, etc. A disable switch may be provided so that welder 45 can, for example, move force sensing transducer assembly 1 conveniently.

Note that terms such as "top," "bottom," "front," and "back" are used herein for convenience when referring to the figures, but are not intended to limit the invention to a specific orientation or configuration.

What is claimed is:

1. An apparatus for controlling welding power of a welding machine having a welding machine torch wielded by a welder, the apparatus comprising:
　　a force sensing transducer assembly for directly sensing force applied by the welder at a pressing surface and for generating a force signal based on the sensed force, without movement past compression or deformation at the pressing surface;
　　a control interface module for generating a welding machine control signal based upon the force signal, the control signal configured to control the welding power of the welding machine;
　　a force signal transmission medium for transmitting the force signal to the control interface module;

a control signal transmission medium for transmitting the control signal to the welding machine; and a welding power transmitting element for transmitting welding power to the welding machine torch, thereby controlling welding arc power.

2. The apparatus of claim 1, further comprising an interface for setting a desired minimum to maximum range of the force signal to control the welding power.

3. The apparatus of claim 2, wherein the interface comprises:

an actuation point sensitivity control for determining the minimum amount of force to configure the welding machine control signal to actuate the welding machine; and a maximum force level control for determining the maximum amount of force that will configure the welding machine control signal to increase the output power of the welding machine;

wherein the actuation point sensitivity control and the maximum force level control are adjustable by the welder.

4. The apparatus of claim 3 further including an indicator of the welding machine control signal.

5. The apparatus of claim 1, further comprising an interface having an indicator of the welding machine control signal level.

6. The apparatus of claim 1 wherein the force sensing transducer assembly includes a force sensing transducer configured to reduce resistance within the force sensing transducer assembly based upon the force; and wherein the force signal is based upon the reduced resistance within the force sensing transducer assembly.

7. The apparatus of claim 1 wherein the pressing surface comprises a tactile button and further comprising a clip configured to attach the force sensing transducer assembly to a common form TIG torch in a manner to allow a welder to apply force to the tactile button using a desired portion of a hand of the welder.

8. The apparatus of claim 1 wherein the force sensing transducer assembly comprises a bite sensor and wherein the pressing surface comprises a tactile button and wherein the bite sensor further comprises:

a second face on an opposing side of the force sensing transducer assembly from the tactile button; and a resilient encapsulating coating surrounding the force sensing transducer assembly;

wherein the bite sensor is sized and configured for the welder to apply force by biting the tactile button and the second face.

9. The apparatus of claim 1 wherein the force sensing transducer assembly comprises a multipurpose sensor wherein the pressing surface comprises a rigid top cover and further comprising:

an enclosure attached to the top cover and having a bottom;

wherein the multipurpose sensor is constructed and arranged for the welder to press the rigid top cover and the enclosure between a body part and a relatively rigid barrier in order to apply force to the top cover.

10. The apparatus of claim 1 wherein the force signal transmission medium is wired.

11. The apparatus of claim 1 wherein the force signal transmission medium is wireless.

12. The apparatus of claim 1 wherein the force signal transmission medium is both wired and wireless.

13. The apparatus of claim 1 wherein the force sensing transducer assembly includes an array of force sensing transducers.

14. The apparatus of claim 1 wherein the control interface module is incorporated into the welding machine.

15. The apparatus of claim 1 wherein the control interface module connects to a remote control plug on the welding machine via a control signal output cable.

16. The apparatus of claim 15 wherein the control interface module further comprises a user interface having an indicator of the welding machine control signal.

17. The apparatus of claim 15 wherein the control interface module comprises a control processor responsive to the force signal, an amplifier, and a relay, and wherein the control processor drives the amplifier to generate a DC signal, the control processor drives the relay to generate a dry contact signal, and wherein the DC signal and the dry contact signal form the control signal.

18. The apparatus of claim 15 wherein the control interface module comprises a transceiver configured to receive the force signal wirelessly.

19. The apparatus of claim 1 wherein the force sensing transducer assembly is encapsulated within a protecting coating formed of a resilient material.

20. The apparatus of claim 19 wherein the protective coating is waterproof.

* * * * *